United States Patent
Nguyen et al.

(10) Patent No.: US 7,346,856 B2
(45) Date of Patent: Mar. 18, 2008

(54) APPARATUS AND METHOD FOR DISTRIBUTING PORTIONS OF LARGE WEB IMAGES TO FIT SMALLER CONSTRAINED VIEWING AREAS

(75) Inventors: Dao Nguyen, Durham, NC (US); Sivakumar Rajendran, Durham, NC (US); Michael Joseph Sullivan, Cedar Park, TX (US); Jonathan Mark Wagner, Round Rock, TX (US)

(73) Assignee: International Business Machines Corporation, Armonk, NY (US)

( * ) Notice: Subject to any disclaimer, the term of this patent is extended or adjusted under 35 U.S.C. 154(b) by 745 days.

(21) Appl. No.: 10/645,200

(22) Filed: Aug. 21, 2003

(65) Prior Publication Data

US 2005/0041859 A1    Feb. 24, 2005

(51) Int. Cl.
*G06F 3/048*    (2006.01)
(52) U.S. Cl. .................. 715/800; 715/760; 715/864; 382/173
(58) Field of Classification Search ............. 715/760, 715/864, 800; 382/173
See application file for complete search history.

(56) References Cited

U.S. PATENT DOCUMENTS

| | | | |
|---|---|---|---|
| 5,983,227 A | 11/1999 | Nazem et al. | 707/10 |
| 6,023,714 A | 2/2000 | Hill et al. | 707/513 |
| 6,049,796 A | 4/2000 | Siitonen et al. | 707/3 |
| 6,300,947 B1 | 10/2001 | Kanevsky | 345/333 |
| 6,311,197 B2 | 10/2001 | Mighdoll et al. | 707/513 |
| 6,313,855 B1 | 11/2001 | Shuping et al. | 345/854 |
| 6,434,403 B1 | 8/2002 | Ausems et al. | 455/556 |
| 6,449,765 B1 | 9/2002 | Ballard | 717/174 |
| 6,593,944 B1* | 7/2003 | Nicolas et al. | 715/744 |
| 6,731,316 B2* | 5/2004 | Herigstad et al. | 715/864 |
| 6,832,353 B2* | 12/2004 | Itavaara et al. | 715/744 |

(Continued)

FOREIGN PATENT DOCUMENTS

EP    1 132 847    12/2001

(Continued)

OTHER PUBLICATIONS

Microsoft Internet Explorer 6 captured image, 2001, p. 1.*

*Primary Examiner*—Weilun Lo
*Assistant Examiner*—TuyetLien Tran
(74) *Attorney, Agent, or Firm*—David A. Mims, Jr.; Rudolf O. Siegesmund; Gordon & Rees, LLP

(57) ABSTRACT

A methodology for displaying a website on a hand held display device (HHDD) is disclosed. The present invention comprises an Image Modification Program (IMP) and a Navigation Program (NP). The IMP analyzes the webpage HTML to determine if an image is present and if the image exceeds the allotted image display space on the HHDD display screen. The IMP calculates the required number of x-axis and y-axis divisions and fragments the image accordingly. The IMP displays the reduced web page on the HHDD, but replaces the reduced image with a fragment from the fragmented image. The fragment is displayed at the intended resolution allowing the user to view a portion of the image at full size, as opposed to the whole image at a reduced size. The NP of the present invention allows the user to move from one fragment to another. An alternative embodiment utilizing a proxy is also disclosed.

22 Claims, 7 Drawing Sheets

U.S. PATENT DOCUMENTS

| | | | |
|---|---|---|---|
| 6,886,034 B2 * | 4/2005 | Blumberg | 709/217 |
| 6,941,382 B1 * | 9/2005 | Tuli | 709/247 |
| 6,955,298 B2 * | 10/2005 | Herle | 235/472.01 |
| 2002/0158908 A1 | 10/2002 | Vaajala et al. | 345/767 |
| 2003/0077002 A1 * | 4/2003 | Silverstein et al. | 382/282 |
| 2003/0135649 A1 * | 7/2003 | Buckley et al. | 709/247 |
| 2004/0100509 A1 * | 5/2004 | Sommerer et al. | 345/864 |

FOREIGN PATENT DOCUMENTS

| | | |
|---|---|---|
| EP | 1 255 186 | 6/2002 |
| JP | PUPA 10-187112 | 7/1998 |
| JP | PUPA 11-175426 | 7/1999 |
| JP | PUPA 2001052154 | 2/2001 |
| JP | PUPA 2001-075771 | 3/2001 |
| JP | PUPA 2002-057875 | 2/2002 |
| JP | PUPA 2002-063108 | 2/2002 |
| JP | PUPA 2002-175135 | 6/2002 |
| JP | PUPA 2002-278540 | 9/2002 |
| JP | PUPA 2002-335570 | 11/2002 |
| JP | PUPA 2002-108284 | 4/2003 |
| JP | PUPA 2003-186794 | 7/2003 |
| JP | PUPA 2003-199097 | 7/2003 |
| WO | 97/17662 | 5/1997 |

* cited by examiner

APPARATUS AND METHOD FOR DISTRIBUTING PORTIONS OF LARGE WEB IMAGES TO FIT SMALLER CONSTRAINED VIEWING AREAS

FIELD OF THE INVENTION

The present invention is directed generally towards an apparatus and method for displaying web pages on hand held display devices and specifically towards an apparatus and method for displaying a fragment of an image at the image's intended resolution.

BACKGROUND OF THE INVENTION

Web pages existing on the Internet are well known in the art. Users view web pages using a web browser such as Microsoft's Internet Explorer® or Netscape's Navigator®. The architects of web pages are generally referred to as web page designers. The web page designers layout web page elements, such as images, text, and hyperlinks, in an orderly fashion so that the user may quickly obtain useful information from the web page. The size of an image on a web page is generally referred to as the image resolution. Web page designers layout the image and set the image resolution for display on desktop or notebook computer screens.

Wireless telephones and personal digital assistants (PDAs) with web browsing capabilities are also well known in the art. These devices are generally known as hand held display devices (HHDDs). FIG. 1 is an example of a prior art webpage commonly viewed on an HHDD. One of the problems encountered with browsing the Internet with a HHDD web browser is that the display screen on a HHDD is much smaller than the display screen on a desktop or notebook computer. In order to display a whole web page on the smaller screen, the HHDDs generally shrink or reduce the web page down to a smaller resolution. Thus, the user sees a smaller version of the entire web page. However, reducing the size of the web page is problematic because the web page elements may become too small to read or understand. Therefore, a need exists in the art for a method of displaying web page elements at their intended resolution on an HHDD display screen.

The prior art has previously addressed the problem of viewing reduced web pages. For example, U.S. Pat. No. 6,300,947 (the '947 patent) entitled "Display Screen and Window Size Related Web Page Adaptation System" discloses a method of adapting web pages to fit onto smaller screens. The method of the '947 patent involves breaking elements of the webpage apart and separately displaying the elements on different screens. However, the method disclosed in the '947 patent is not preferable because the user is not able to view an image at the intended resolution.

U.S. Patent Application Publication 2002/0158908 (the '908 application) entitled "Web Browser User Interface for Low-Resolution Displays" also discloses a method of adapting web pages to fit onto smaller screens. The method of the '908 application displays the web page at the web page's full resolution, but only displays a portion of the web page on the HHDD display screen. The method of the '908 application is not preferable because the user is only able to view a portion of the webpage and is required to view all elements of the webpage at full resolution.

Consequently, a need exists in the art for an improved apparatus and method of viewing a web page on a HHDD. The need extends to an apparatus and method which allows the user to view the entire web page and simultaneously view images at the image's intended resolution. Moreover, the need extends to a method which allows the user to navigate images such that the user may view the entire image at the image's intended resolution, albeit in separate, distinct sections.

SUMMARY OF THE INVENTION

The present invention, which meets the needs stated above, is a methodology for displaying a website on a hand held display device (HHDD), such as a wireless telephone or personal digital assistant (PDA). The software embodiment of the present invention comprises an Image Modification Program (IMP) and a Navigation Program (NP). The IMP analyzes the webpage HTML to determine if an image is present and, if so, if the image exceeds the allotted image display space on the HHDD display screen. If the image does exceed the allotted space on the display screen, the IMP calculates the required number of x-axis and y-axis divisions and fragments the image accordingly. The present invention displays the reduced web page on the HHDD, but replaces the reduced image with a fragment from the fragmented image. The fragment is displayed at the resolution intended by the web page designer. Thus the present invention differs from the prior art in that the user views the web page with a portion of the image at full size, as opposed to the whole image at a reduced size. The NP of the present invention allows the user to move from one fragment to another.

Alternatively, the software embodiment of the present invention may comprise a Proxy Modification Program (PMP) and a Proxy Navigation Program (PNP). The PMP and PNP work similarly to the IMP and NP, but utilize a proxy to decrease the amount of information that must be transmitted to the HHDD. Specifically, the PMP fragments the image and only sends a single fragment along with the reduced web page to the HHDD. If desired, the user may request other fragments using the PNP.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

As used herein the term "computer" shall mean a machine having a processor, a memory, and an operating system, capable of interaction with a user or other computer, and shall include without limitation desktop computers, notebook computers, personal digital assistants (PDAs), servers, handheld computers, and similar devices.

As used herein, the term "display screen" means a device used to display a graphical user interface of a computer program. Examples of display screens are liquid crystal display (LCD) screens, plasma screen, cathode ray tubes, computer monitors, thin film transistor (TFT) screens, and the like. Persons of ordinary skill in the art are aware of other types of display screens.

As used herein, the term "HHDD" is an acronym for "hand held display device" and means any portable device capable of displaying an image. Examples of HHDDs are wireless telephones, personal digital assistants (PDAs), handheld computers, digital cameras, and similar devices.

As used herein, the term "image" means any graphical depiction of an object or scene. Images are typically stored in computer files ending with a .jpg, .bmp, or .gif file name suffix. Persons of ordinary skill in the art are aware of other types of image files.

As used herein, the term "resolution" means the size of an image or screen. Resolution is measured in pixels in both the x-axis and the y-axis.

Figure 2:
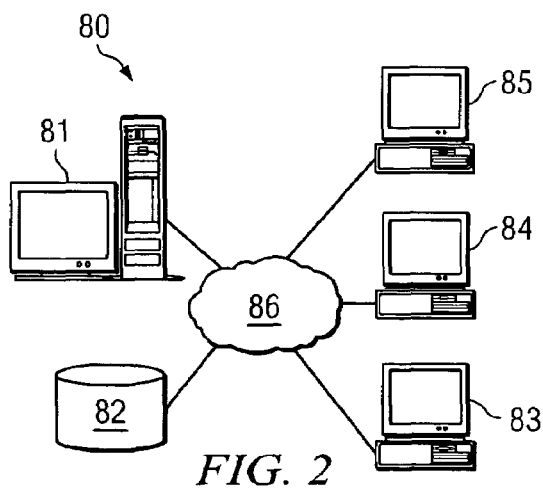
FIG. 2 is an illustration of a computer network used to implement the present invention.

FIG. 2 is an illustration of computer network 80 associated with the present invention. Computer network 80 comprises local machine 85 electrically coupled to network 86. Local machine 85 is electrically coupled to remote machine 84 and remote machine 83 via network 86. Local machine 85 is also electrically coupled to server 81 and database 82 via network 86. Network 86 may be a simplified network connection such as a local area network (LAN) or may be a larger network such as a wide area network (WAN) or the Internet. Furthermore, computer network 80 depicted in FIG. 2 is intended as a representation of a possible operating network that may contain the present invention and is not meant as an architectural limitation.

Figure 3:
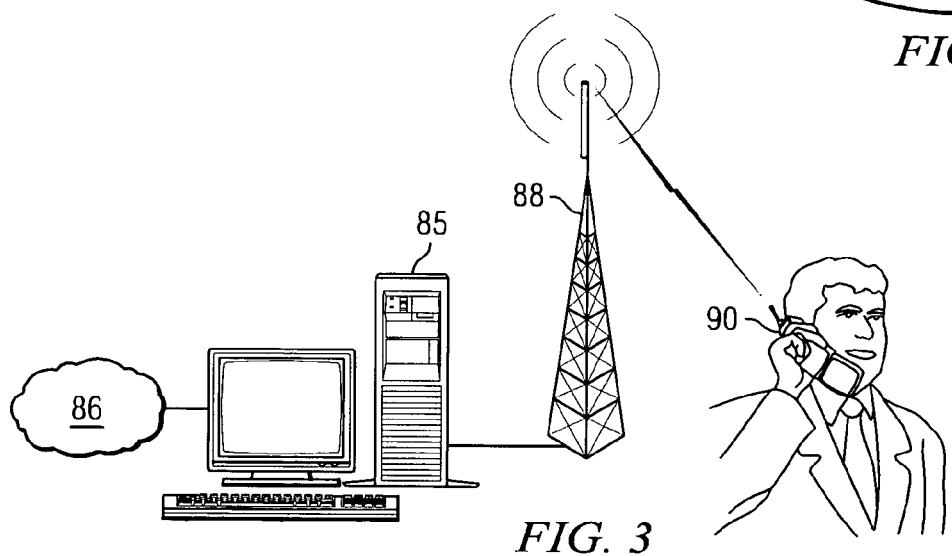
FIG. 3 is an illustration of a communications system used to implement the present invention.

FIG. 3 is an illustration of a communications network used to implement the present invention. Local machine 85, connected to network 86 may also be connected to transmitter/receiver 88. Transmitter/receiver 88 is capable of wireless communication with a plurality of devices, including hand held display device (HHDD) 90. HHDD 90 is capable of two-way communication with computer network 80, which may be the Internet, through transmitter/receiver 88 and local machine 85.

Figure 4:
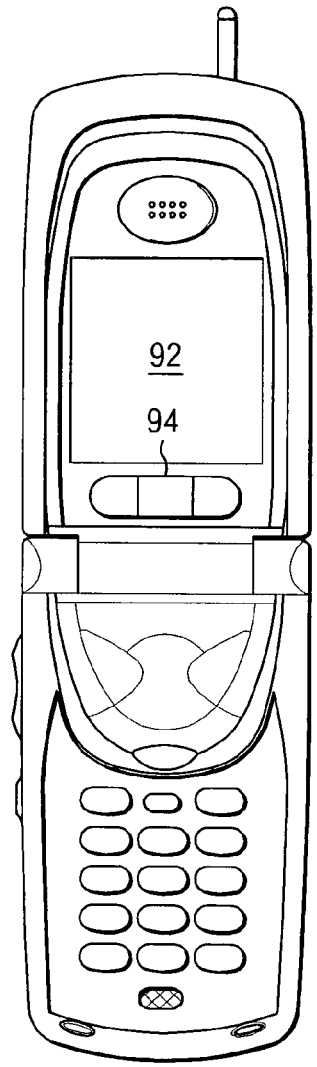
FIG. 4 is an illustration of a HHDD used to implement the present invention.

FIG. 4 is an illustration of HHDD 90. HHDD 90 comprises display screen 92 and navigation buttons 94. When HHDD 90 is used to access the Internet, the user may view web pages on display screen 92 and enter data through a plurality of navigation buttons 94.

Figure 5:
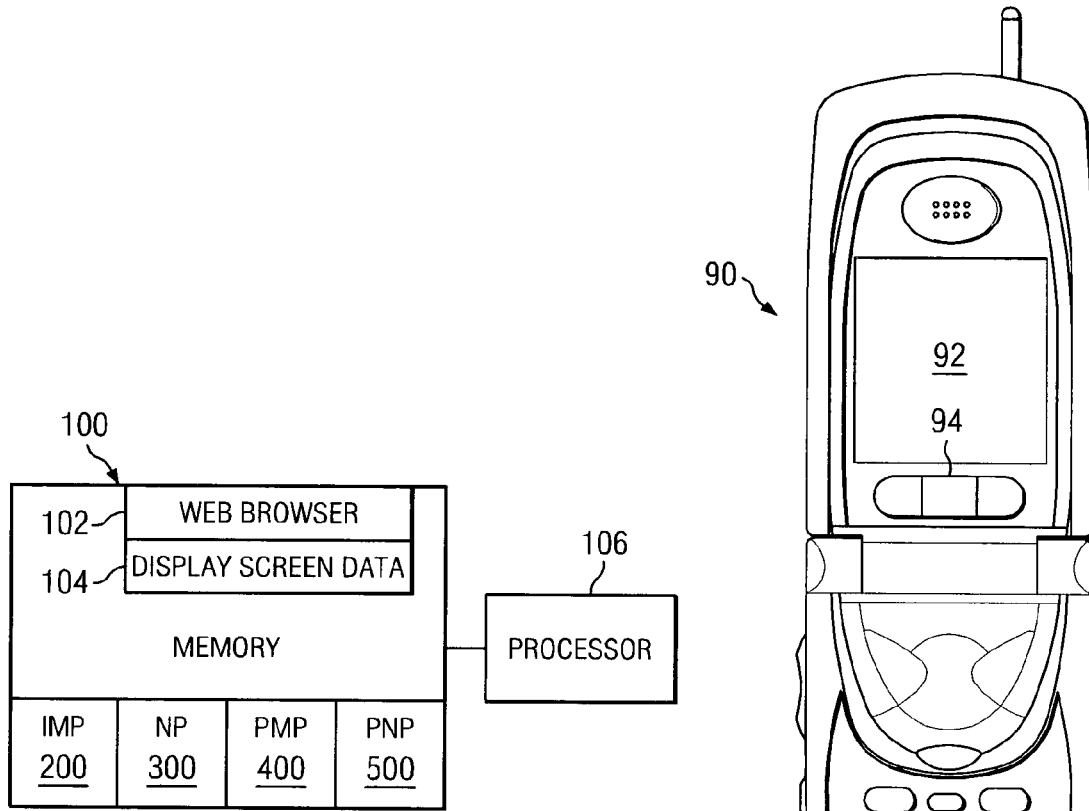
FIG. 5 is an illustration of the memory used to implement the present invention.

The internal configuration of a computer, including connection and orientation of the processor, memory, and input/output devices, is well known in the art. The present invention is a methodology that can be embodied in a computer program. Referring to FIG. 5, the methodology of the present invention is implemented on software by Image Modification Program (IMPP) 200. IMP 200 includes Navigation Program (NP) 300, Proxy Modification Program (PMP) 400, and Proxy Navigation Program (PNP) 500. IMP 200, NP 300, PMP 400, and PNP 500 described herein can be stored within the memory of any computer depicted in FIG. 2 or HHDD 90 depicted in FIGS. 3 and 4. Alternatively, IMP 200, NP 300, PMP 400, and PNP 500 can be stored in an external storage device such as a removable disk, a CD-ROM, or a USB storage device. Memory 100 is illustrative of the memory within one of the computers of FIGS 2, 3 or 4. Memory 100 also contains web browser 102 and display screen data 104. The present invention may interface with web browser 102 and/or display screen data 104 through memory 100. As part of the present invention, the memory 100 can be configured with IMP 200, NP 300, PMP 400, and/or PNP 500. Processor 106 can execute the instructions contained in IMP 200, NP 300, PMP 400, and/or PNP 500.

In alternative embodiments, IMP 200, NP 300, PMP 400, and/or PNP 500 can be stored in the memory of other computers. Storing IMP 200, NP 300, PMP 400, and/or PNP 500 in the memory of other computers allows the processor workload to be distributed across a plurality of processors instead of a single processor. Further configurations of IMP 200, NP 300, PMP 400, and/or PNP 500 across various memories are known by persons of ordinary skill in the art.

Figure 6:
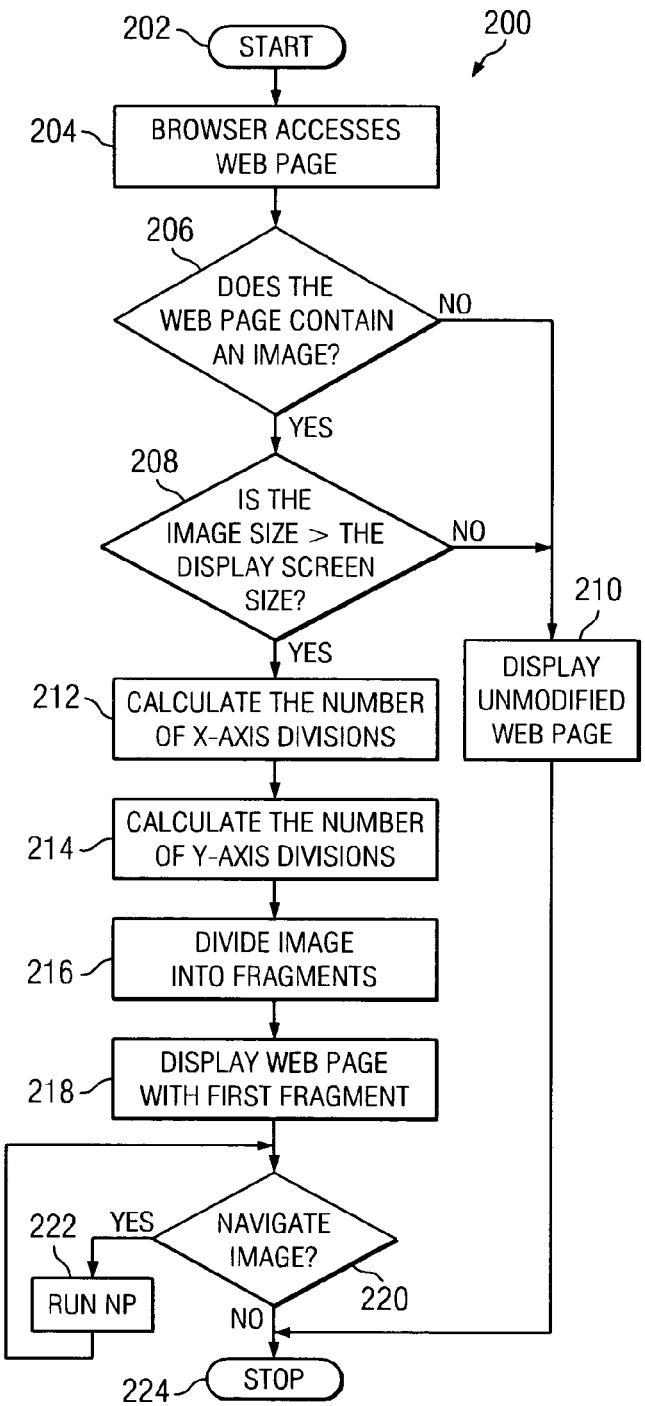
FIG. 6 is an illustration of the logic of the Image Modification Program (IMP) of the present invention.

Turning to FIG. 6, the logic of Image Modification Program (IMP) 200 is illustrated. IMP 200 is a program that fragments images displayed on a HHDD and displays a portion of the original image at its intended resolution. IMP 200 starts (202) whenever the user opens a web browser application. Web browsers are well known in the art and examples of web browsers include Microsoft's Internet Explorer® and Netscape's Navigator®. When using a web browser, the user enters a desired web page uniform resource locator (URL) and IMP 200 follows the web browser to the desired web page (204). IMP 200 then analyzes the web page's hyper text markup language (HTML) and determines if the web page contains an image (206). For purposes of determining if an image is present, IMP 200 searches for files containing a .bmp, .jpg, or .gif file ending. Persons of ordinary skill in the art will be aware of other file endings for image files. If the web page does not contain any images, then IMP 200 displays the web page without modification (210) and ends (224). If at step 206 IMP 200 determines that the web page contains an image, then IMP 200 proceeds to step 208.

At step 208 IMP 200 determines if the image size is greater than the area on the display screen size of the HHDD which is allocated to display the image (208). IMP 200 can determine the size of the display screen from the display screen data 104 illustrated in FIG. 5. The area of the display screen which is allocated to display the image will depend on the layout of the web page and can be obtained from the web page HTML. IMP 200 can access the image size from the image data in the web page HTML. The image size is the intended resolution of the image. In comparing the image size to the display screen size, IMP 200 will determine that the image is larger than the display screen if either: the x-axis dimension of the image is larger than the x-axis dimension of the allocated space on the display screen, or the y-axis dimension of the image is larger than the y-axis dimension of the allocated space on the display screen. Because the HHDD displays the entire web page, the image size will almost always be larger than the allocated screen display area. In some embodiments, the area on the display screen allocated to display the image may be the entire display screen on the HHDD. If IMP 200 determines that the image size is not less than the allocated display screen size, then IMP 200 displays the web page without modification (210) and ends (224). If IMP 200 determines that the image size is larger than the allocated display screen size, then IMP 200 proceeds to step 212.

At step 212, IMP 200 calculates the number of x-axis divisions (212). The number of x-axis divisions is equal to the image x-axis dimension divided by the allocated screen x-axis dimension, rounded up to the nearest whole number. Rounding up ensures that the image will be displayed at the intended resolution. For example, if an image has an x-axis dimension of 600 pixels and the allocated screen x-axis dimension is 200 pixels, then there are three x-axis divisions $$\left(\frac{600 \text{ pixels}}{200 \text{ pixels}} = 3 \text{ divisions}\right).$$

If the quotient obtained in calculating the x-axis divisions contains a remainder, then the last x-axis division will contain part of the original image displayed at the intended resolution.

At step 214, IMP 200 calculates the number of y-axis divisions (214). The number of y-axis divisions is equal to the image y-axis dimension divided by the allocated screen y-axis dimension, rounded up to the nearest whole number. Rounding up ensures that the image will be displayed at the intended resolution. For example, if an image has a y-axis dimension of 405 pixels and the allocated screen y-axis dimension is 135 pixels, then there are three y-axis divisions $$\left(\frac{405 \text{ pixels}}{135 \text{ pixels}} = 3 \text{ divisions}\right).$$

If the quotient obtained in calculating the y-axis divisions contains a remainder, then the last y-axis division will contain part of the original image displayed at the intended resolution.

Next, IMP 200 divides the image into fragments (216). The number of fragments is equal to the number of x-axis divisions multiplied by the number of y-axis divisions. When fragmenting the image, IMP 200 repeatedly breaks-up the image into fragments along the x-axis at the allocated screen x-axis dimension. For example, if the image is 600 pixels wide along the x-axis and the allocated screen x-axis dimension is 200 pixels, then IMP 200 will break up the image at the $200^{th}$ pixel and the $400^{th}$ pixel, producing a total of three fragments along the x-axis. Similarly, IMP 200 repeatedly breaks-up the image into fragments along the y-axis at the allocated screen y-axis dimension. For example, if the image is 405 pixels wide along the y-axis and the allocated screen y-axis dimension is 135 pixels, then IMP 200 will break up the image at the $135^{th}$ pixel and the $270^{th}$ pixel, producing a total of three fragments along the y-axis. Thus, the total image is broken into nine distinct fragments. An example of a fragmented image can be seen in FIG. 10. IMP 200 stores the fragmented image in cache memory under a distinct file name.

IMP 200 then displays the web page with the first fragment replacing the original image (218). In displaying the web page, IMP 200 displays the entire web page in the reduced resolution similar to the prior art method of displaying a web page on a smaller screen. However, the present invention differs from the prior art in that IMP 200 replaces the original image with a fragment of the original image. The image fragment is displayed at the image resolution intended by the web page designer. When displaying the image fragment, IMP 200 can first display the center fragment or any other fragment as determined by persons of ordinary skill in the art.

IMP 200 then determines if the user wants to navigate the image (220). If the user wants to navigate the image, then IMP 200 runs NP 300 (222) and returns to step 220. If the user does not want to navigate the image, IMP 200 ends (224).

Figure 7:
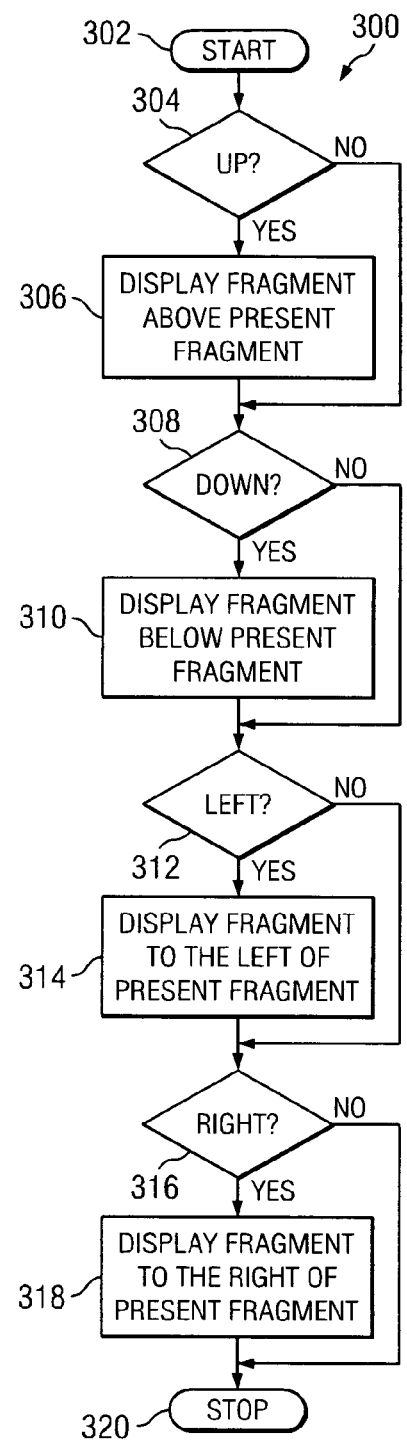
FIG. 7 is an illustration of the logic of the Navigation Program (NP) of the present invention.

Turning to FIG. 7, the logic of Navigation Program (NP) 300 is illustrated. NP 300 is a program that navigates the image fragmented by IMP 200. NP 300 starts (302) when prompted by IMP 200. NP 300 then makes a determination whether the user has pressed an up button (304). If the user has pressed the up button, NP 300 displays the fragment directly above the present fragment (306) and proceeds to step 308. If the user has not pressed the up button, then NP 300 proceeds to step 308 where NP 300 makes a determination whether the user has pressed the down button (308). If the user has pressed the down button, NP 300 displays the fragment directly below the present fragment (310) and proceeds to step 312. If the user has not pressed the down button, then NP 300 proceeds to step 312 where NP 300 makes a determination whether the user has pressed the left button (312). If the user has pressed the left button, NP 300 displays the fragment directly to the left of the present fragment (314) and proceeds to step 316. If the user has not pressed the left button, then NP 300 proceeds to step 316 where NP 300 makes a determination whether the user has pressed the right button (316). If the user has pressed the right button, NP 300 displays the fragment directly to the right of the present fragment (318) and ends (320). If the user has not pressed the right button, then NP 300 ends (320).

Persons of ordinary skill in the art are aware of other methods of indicating a desire to navigate a fragmented image other than pressing buttons. Persons of ordinary skill in the art will also appreciate that a fragmented image may be wrapped top-to-bottom such that a user can reach the top row of a fragmented image by pressing down from the bottom row and vice-versa. Similarly, persons of ordinary skill in the art will also appreciate that a fragmented image may be wrapped left-to-right such that a user can reach the left row of a fragmented image by pressing right from the right row and vice-versa.

Figure 8:
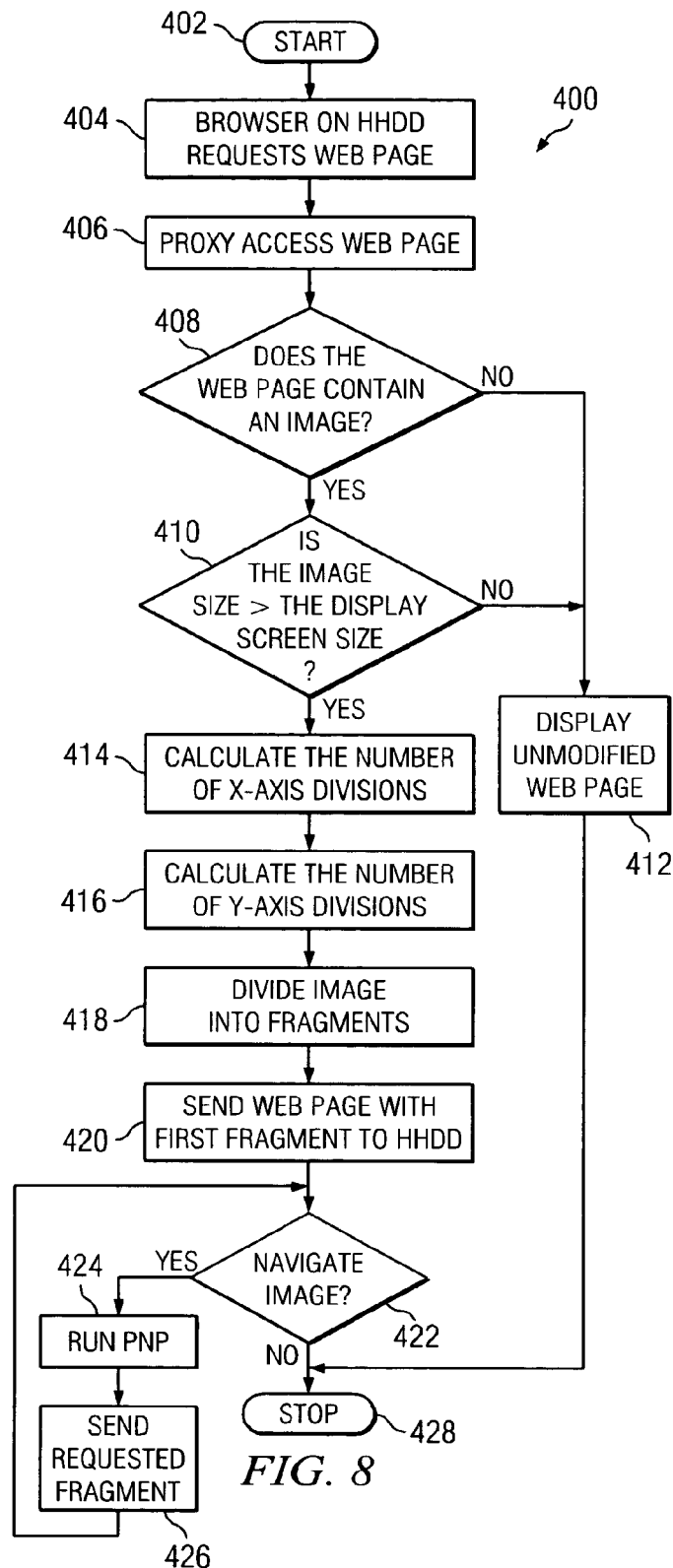
FIG. 8 is an illustration of the logic of the Proxy Modification Program (PMP) of the present invention.

Turning to FIG. 8, the logic of Proxy Modification Program (PMP) 400 is illustrated. PMP 400 is a program that fragments images displayed on a HHDD and displays a portion of the original image at its intended resolution, similar to PMP 200, but with the use of a proxy. PMP 400 operates on a proxy and automatically fragments the image for the HHDD. PMP 400 starts (402) whenever the user opens a web browser application. PMP 400 follows the web browser to the desired web page (404). PMP 400 accesses the web page (406) and analyzes the web page's HTML and determines if the web page contains an image (408). For purposes of determining if an image is present, PMP 400 searches for files containing a .bmp, .jpg, or .gif file ending. Persons of ordinary skill in the art will be aware of other file endings for image files. If the web page does not contain any images, then PMP 400 displays the web page without modification (412) and ends (428). If at step 408 PMP 400 determines that the web page contains an image, then PMP 400 proceeds to step 410.

At step 410 PMP 400 determines if the image size is greater than the area on the display screen size of the HHDD which is allocated to display the image (410). PMP 400 analyzes the display screen size and image size similarly to IMP 200. If PMP 400 determines that the image size is not less than the allocated display screen size, then PMP 400 displays the web page without modification (412) and ends (428). If PMP 400 determines that the image size is larger than the allocated display screen size, then PMP 400 proceeds to step 414 where PMP 400 calculates the number of x-axis divisions (414). PMP 400 calculates the number of x-axis divisions similarly to IMP 200. PMP 400 then calculates the number of y-axis divisions (416). PMP 400 calculates the number of y-axis divisions similarly to IMP 200.

Next, PMP 400 divides the image into fragments (418). PMP 400 divides the image into fragments similarly to IMP 200. PMP 400 then sends the web page with the first fragment to the HHDD (420). PMP 400 stores the fragmented image on the proxy so that only a portion of the original image is transmitted to the HHDD. The HHDD may then display the web page with the fragmented image similarly to IMP 200. An example of a portion of the HTML code used execute step 420 is:

```
<FORM METHOD="POST" ACTION="bitmap.pl">
<IMP SRC="../tmp/image.jpg" WIDTH=99 HEIGHT=72 BORDER=1>
<INPUT TYPE="HIDDEN" NAME="url" VALUE=http://initialimage.jpg>
<INPUT TYPE="HIDDEN" NAME="program" VALUE="Unique_Identifier">
<INPUT TYPE="HIDDEN" NAME="state" VALUE="5">
<INPUT TPYE="IMAGE" SRC = "../icons/small/arrow-left.jpg" NAME="L"
VALUE="L">
<INPUT TPYE="IMAGE" SRC = "../icons/small/arrow-right.jpg" NAME="R"
VALUE="R">
<INPUT TPYE="IMAGE" SRC = "../icons/small/arrow-up.jpg" NAME="U"
VALUE="U">
<INPUT TPYE="IMAGE" SRC = "../icons/small/arrow-down.jpg" NAME="D"
VALUE="D">
</FORM>
```

PMP 400 then determines if the user wants to navigate the image (422). If the user wants to navigate the image, then PMP 400 runs PNP 500 on the HHDD (424). PNP 400 then sends the requested fragment to the HHDD (426) and returns to step 422. If at step 422 the user does not want to navigate the image, PMP 400 ends (428).

Figure 9:
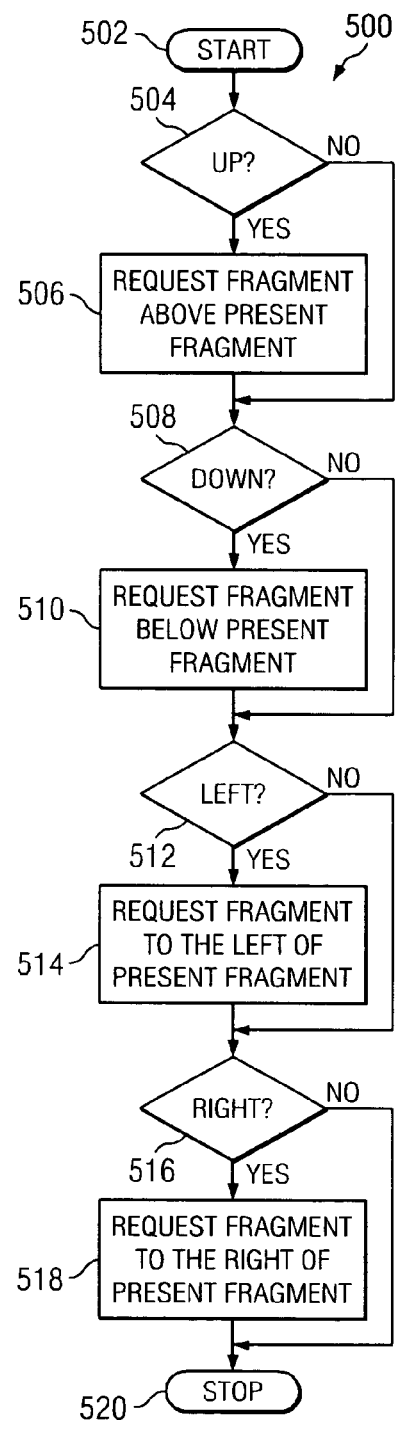
FIG. 9 is an illustration of the logic of the Proxy Navigation Program (PNP) of the present invention.

Turning to FIG. 9, the logic of Proxy Navigation Program (PNP) 500 is illustrated. PNP 500 is a program that navigates the image fragmented by IMP 200. PNP 500 starts (502) when prompted by PMP 400. PNP 500 then makes a determination whether the user has pressed an up button (504). If the user has pressed the up button, PNP 500 requests the fragment directly above the present fragment (506) and proceeds to step 508. If the user has not pressed the up button, then PNP 500 proceeds to step 508 where PNP 500 makes a determination whether the user has pressed the down button (508). If the user has pressed the down button, PNP 500 requests the fragment directly below the present fragment (510) and proceeds to step 512. If the user has not pressed the down button, then PNP 500 proceeds to step 512 where PNP 500 makes a determination whether the user has pressed the left button (512). If the user has pressed the left button, PNP 500 requests the fragment directly to the left of the present fragment (514) and proceeds to step 516. If the user has not pressed the left button, then PNP 500 proceeds to step 516 where PNP 500 makes a determination whether the user has pressed the right button (516). If the user has pressed the right button, PNP 500 requests the fragment directly to the right of the present fragment (518) and ends (520). If the user has not pressed the right button, then PNP 500 ends (520).

Figure 1:
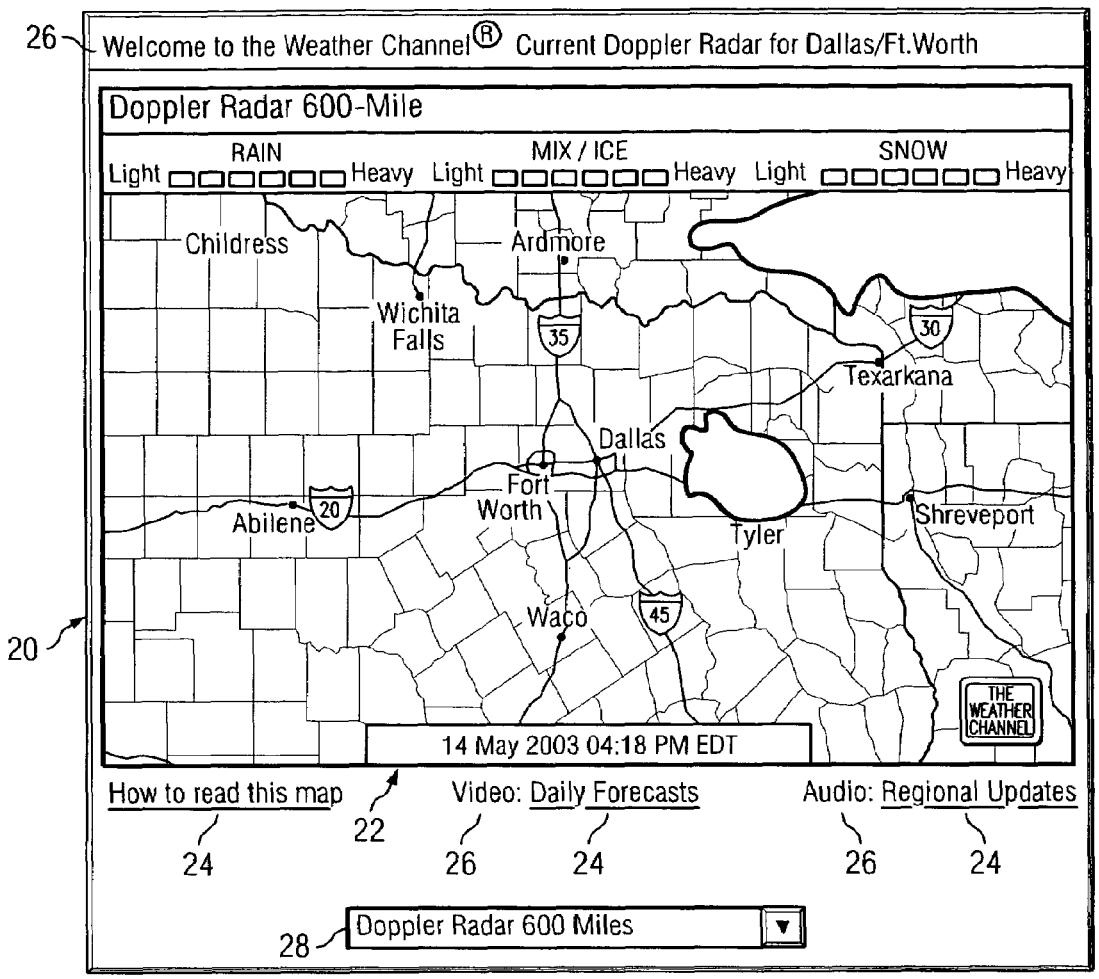
FIG. 1 is an example of a prior art webpage commonly viewed on a hand-held display device (HHDD)
Figure 10:
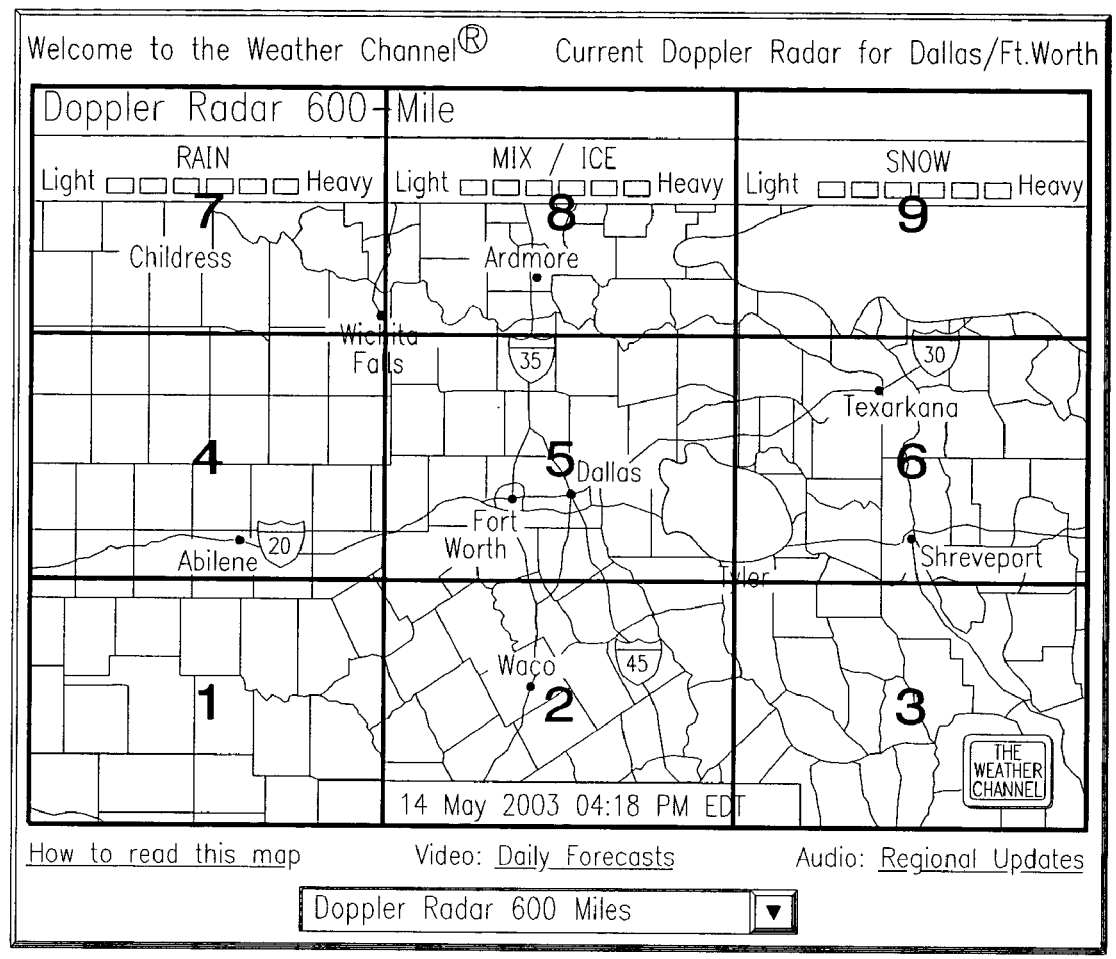
FIG. 10 is an example of the fragmented image produced by the present invention.
Figure 11:
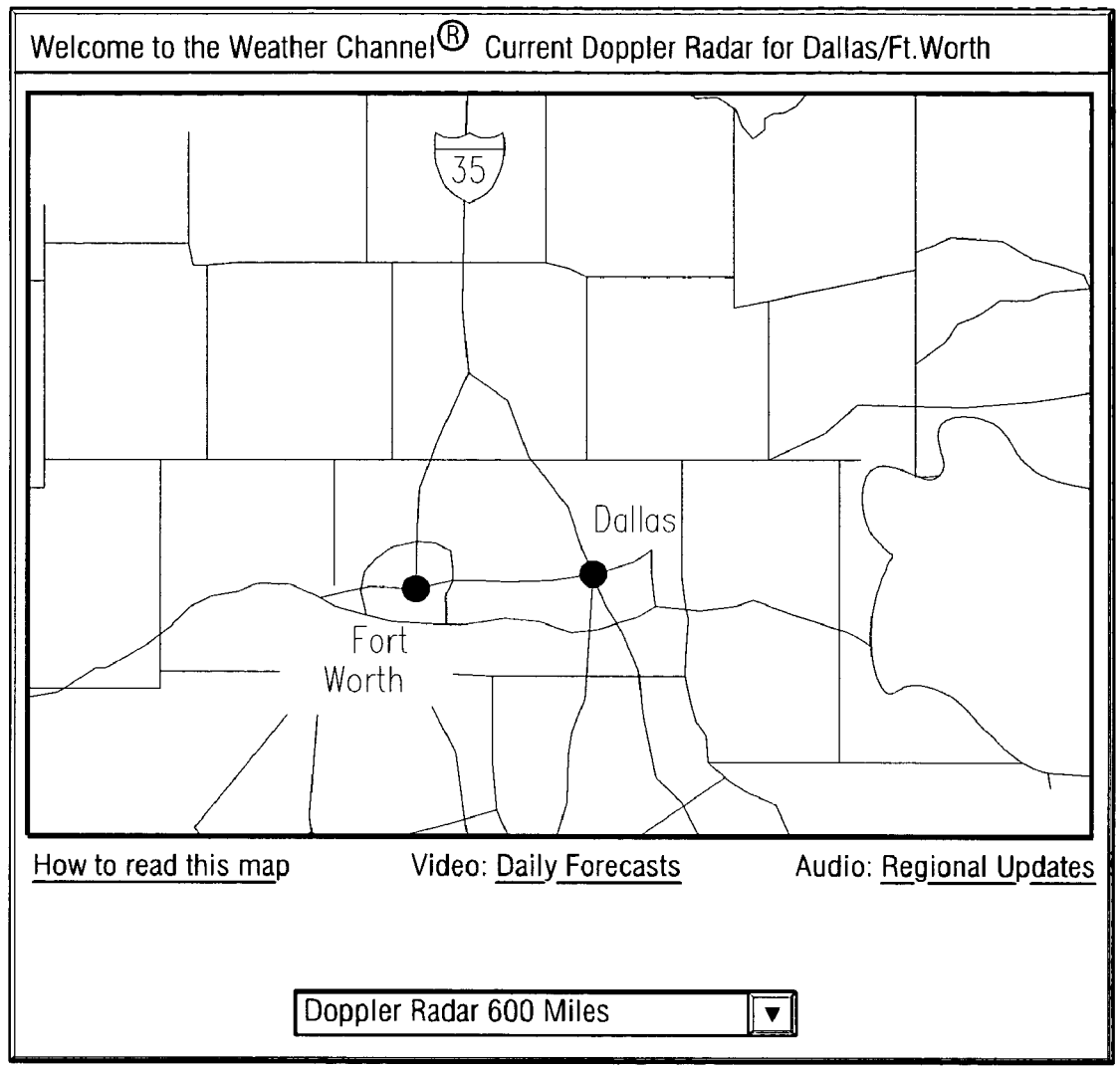
FIG. 11 is an example of a web browser displaying an image produced by the present invention.
Figure 12:
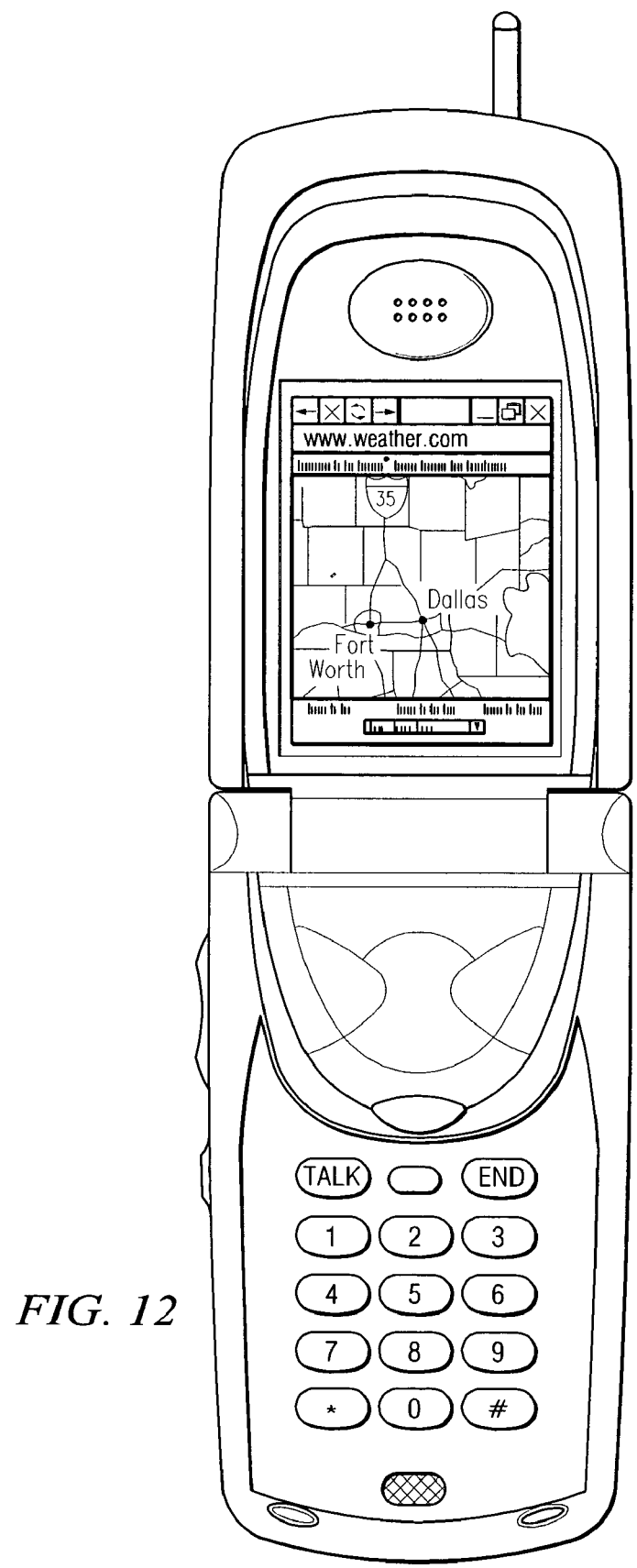
FIG. 12 is illustration of a HHDD with a web browser displaying an image produced by the present invention.

Turning to FIG. 1, an image from a web page is illustrated. The illustrated image is characteristic of the type of image that a HHDD user would want to access. The illustration contains a large amount of information displayed in great detail. When an image, such as the illustration in FIG. 1, is reduced to fit onto the smaller screen of a HHDD, much of the information on the image will be too small to be of any use to the user. Therefore, the present invention fragments the image using IMP 200 or PMP 400, as illustrated in FIG. 10. One of the numbered fragments may then be displayed on the HHDD such that the user can view a portion of the original image, but is able to discern all of the information that is readily discernable from the image because the image is displayed at the intended resolution. FIG. 11 is an illustration of a web browser utilizing the present invention. FIG. 12 is an illustration of a HHDD running a web browser utilizing the present invention. As can be seen in FIGS. 11 and 12, the web browser displays the reduced web page, but the reduced image has been replaced by the fifth (center) image fragment so that the user may view the image at the intended resolution.

While the preferred embodiment of the present invention is directed at browsing the Internet using a HHDD, the preferred embodiment is not meant as a limitation of the present invention. For example, certain aspects of the present invention may be applicable to digital camera displays, particularly in higher resolution digital cameras. The liquid crystal display (LCD) screen of a digital camera can use the present invention to show the full size digital picture at the same resolution the digital picture will be printed. In addition, those skilled in the art will realize that the above described invention may be embodied in a computer program product stored on a computer usable medium. The present invention may also be applicable to full size display screen as well. Other applications of the novel and non-obvious aspects presented herein will be appreciated by a person of ordinary skill in the art.

With respect to the above description, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention. The novel spirit of the present invention is still embodied by reordering or deleting some of the steps contained in this disclosure. The spirit of the invention is not meant to be limited in any way except by proper construction of the following claims.

What is claimed is:

1. A method for displaying a web page containing an image on a hand held display device screen comprising:
   determining if the size of the image is larger than an allocated display area on the hand held display device screen when the web page is displayed as a reduced web page on the hand held display device screen;
   responsive to a determination that the image is larger than the allocated display area, dividing the image into a plurality of fragments; and
   displaying the reduced web page containing a fragment from the plurality of fragments in the allocated display area;
   wherein a number of fragments is determined by calculating a number of x axis divisions and a number of y axis divisions;
   wherein calculating the number of x axis divisions and the number of y axis divisions is based on pixels; and
   wherein the image is divided into a plurality of fragments without a translation into a bit map image or a raster image;
   wherein the image has an intended resolution; and
   wherein the web page is displayed at a reduced resolution and the fragment is displayed at the image's intended resolution.

2. The method of claim 1 further comprising: responsive to a determination that the image is not larger than the allocated display area, displaying the unmodified image.

3. The method of claim 1 further comprising:
   determining if the web page contains the image; and
   responsive to a determination that the web page contains the image, performing the determining if the size of an image is larger than an allocated display area step.

4. The method of claim 1 further comprising:
   determining if the web page contains the image; and
   responsive to a determination that the web page does not contains the image, displaying the unmodified web page.

5. The method of claim 1 further comprising: calculating the number of x-axis divisions.

6. The method of claim 1 further comprising: calculating the number of y-axis divisions.

7. The method of claim 1 further comprising:
   determining if a user wants to navigate the image; and
   responsive to a determination that a user wants to navigate the image, running an navigation program.

8. The method of claim 1 wherein the displaying step occurs on a hand held display device.

9. The method of claim 1 further comprising:
   accessing the web page through a proxy; and
   wherein the proxy sends only one fragment to a hand held display device.

10. The method of claim 9 further comprising:
    requesting another fragment; and
    wherein the proxy sends another fragment to the hand held display device.

11. The method of claim 1 wherein the image is stored in an image file ending in .gif, .jpg, or .bmp.

12. A program product operable on a computer for displaying a web page containing an image on a hand held display device screen, the program product comprising: a computer readable medium;
    wherein the computer readable medium contains instructions encoded thereon for causing a computer to perform the following steps:
    analyzing a web page containing an image;
    determining if the size of the image is larger than an allocated display area on a hand held device;
    responsive to a determination that the image is larger than the allocated display area, dividing the image into a plurality of fragments; and
    displaying the web page as reduced web page containing a fragment from the plurality of fragments in the allocated display area;
    wherein a number of fragments is determined by calculating a number of x axis divisions and a number of y axis divisions;
    wherein calculating the number of x axis divisions and the number of y axis divisions is based on pixels; and
    wherein the image is divided into a plurality of fragments without a translation into a bit map image or a raster image;
    wherein the image has an intended resolution; and
    wherein the web page is displayed at a reduced resolution and the fragment is displayed at the image's intended resolution.

13. The program product of claim 12 further comprising: responsive to a determination that the image is not larger than the allocated display area, instructions for displaying the unmodified image.

14. The program product of claim 12 further comprising:
    instructions for determining if the web page contains the image; and
    responsive to a determination that the web page contains the image, instructions for performing the determining if the size of an image is larger than an allocated display area step.

15. The program product of claim 12 further comprising:
    instructions for determining if the web page contains the image; and
    responsive to a determination that the web page does not contains the image, instructions for displaying the unmodified web page.

16. The program product of claim 12 further comprising: instructions for calculating the number of x-axis divisions.

17. The program product of claim 12 further comprising: instructions for calculating the number of y-axis divisions.

18. The program product of claim 12 further comprising:
    instructions for determining if a user wants to navigate the image; and
    responsive to a determination that a user wants to navigate the image, instructions for running an navigation program.

19. The program product of claim 12 wherein the instructions for displaying step occurs on a hand held display device.

20. The program product of claim 12 further comprising:
    instructions for accessing the web page through a proxy; and
    wherein the proxy sends only one fragment to a hand held display device.

21. The program product of claim 20 further comprising:
    instructions for requesting another fragment; and
    wherein the proxy sends another fragment to the hand held display device.

22. The program product of claim 12 wherein the image is stored in an image file ending in .gif, .jpg, or .bmp.

* * * * *